(12) United States Patent
Kondo

(10) Patent No.: US 8,786,894 B2
(45) Date of Patent: Jul. 22, 2014

(54) IMAGE PROCESSING APPARATUS

(75) Inventor: Masaki Kondo, Toyoake (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 12 days.

(21) Appl. No.: 13/051,032

(22) Filed: Mar. 18, 2011

(65) Prior Publication Data

US 2011/0235063 A1    Sep. 29, 2011

(30) Foreign Application Priority Data

Mar. 23, 2010   (JP) ................................. 2010-065499

(51) Int. Cl.
| | |
|---|---|
| G06K 15/02 | (2006.01) |
| G06K 15/00 | (2006.01) |
| H04N 1/60 | (2006.01) |
| H04N 1/40 | (2006.01) |
| H04N 1/405 | (2006.01) |
| H04N 1/04 | (2006.01) |

(52) U.S. Cl.
USPC ........... 358/1.2; 358/3.13; 358/1.14; 358/1.9; 358/3.03; 358/3.15; 358/3.21; 358/3.27; 358/448; 358/474

(58) Field of Classification Search
USPC ................ 358/1.2, 1.14, 1.9, 3.21, 3.03, 448, 358/3.27, 3.15
See application file for complete search history.

(56) References Cited

U.S. PATENT DOCUMENTS

| | | | |
|---|---|---|---|
| 5,835,233 A | 11/1998 | Otsu et al. | |
| 6,044,204 A | 3/2000 | Takamatsu et al. | |
| 2002/0089685 A1* | 7/2002 | Kakutani | 358/1.14 |
| 2005/0286087 A1 | 12/2005 | Hirano | |
| 2007/0206228 A1* | 9/2007 | Miyagi | 358/3.21 |
| 2008/0018937 A1 | 1/2008 | Kimakura | |
| 2009/0034002 A1 | 2/2009 | Shibaki et al. | |
| 2009/0257099 A1 | 10/2009 | Sato et al. | |

FOREIGN PATENT DOCUMENTS

| | | |
|---|---|---|
| EP | 1032193 A1 | 8/2000 |
| JP | H07-046391 A | 2/1995 |
| JP | H07-107280 A | 4/1995 |
| JP | H08-228298 A | 9/1996 |

(Continued)

OTHER PUBLICATIONS

Japan Patent Office, Notification of Reason for Refusal for Japanese Patent Application No. 2010-065499 (counterpart to above-captioned patent application), issued Dec. 1, 2011.
Japan Patent Office, Notification of Reasons for Refusal for Japanese Patent Application No. 2010-065499 (counterpart to above-captioned patent application), dispatched Feb. 28, 2012.

(Continued)

*Primary Examiner* — Marivelisse Santiago Cordero
*Assistant Examiner* — Temitayo Folayan
(74) *Attorney, Agent, or Firm* — Baker Botts L.L.P.

(57) ABSTRACT

An image processing apparatus causes a printing executing section to perform a printing process using color-materials, the image processing apparatus includes: a first processing unit that performs a first image-processing by processing original image data in order to generate first processed image data; and a supplying unit, wherein the first processing unit includes: a calculating unit that calculates an index value relating an edge-intensity about a target pixel in object image data; and a correcting unit that corrects a value of the target pixel based on the index value of the edge-intensity, wherein the correcting unit corrects the value of the target pixel such that print-density of the target pixel increase if the target pixel is a first pixel, and wherein the correcting unit corrects the value of the target pixel such that print-density of the target pixel decrease if the target pixel is a second pixel.

16 Claims, 10 Drawing Sheets

(56) References Cited

FOREIGN PATENT DOCUMENTS

| | | |
|---|---|---|
| JP | H09-307768 A | 11/1997 |
| JP | H10-065918 A | 3/1998 |
| JP | H11-308450 A | 11/1999 |
| JP | 2000-043315 A | 2/2000 |
| JP | 2000-253253 A | 9/2000 |
| JP | 2006-013769 A | 1/2006 |
| JP | 2006-019930 A | 1/2006 |
| JP | 2006-215156 A | 8/2006 |
| JP | 2007-006392 A | 1/2007 |
| JP | 2007-324791 A | 12/2007 |
| JP | 2008-219386 A | 9/2008 |
| JP | 2008-227732 A | 9/2008 |
| JP | 2009-037283 A | 2/2009 |
| JP | 2009-258224 A | 11/2009 |

OTHER PUBLICATIONS

Japan Patent Office, Notification of Reasons for Refusal for Japanese Patent Application No. 2012-022042 (counterpart to above-captioned patent application), mailed Jun. 25, 2013.

The State Intellectual Property Office of the People's Republic of China, Notification of First Office Action for Chinese Patent Application No. 201110070646.3 (counterpart Chinese patent application), issue Mar. 13, 2013.

Japan Patent Office, Notification of Reason for Refusal for Japanese Patent Application No. 2012-022042 (counterpart Japanese patent application), dispatched Feb. 5, 2013.

The State Intellectual Property Office of the People's Republic of China, Notification of the Second Office Action for Chinese Patent Application No. 201110070646.3 (counterpart Chinese patent application), issue Jan. 3, 2014.

* cited by examiner

IMAGE PROCESSING APPARATUS

CROSS-REFERENCE TO RELATED APPLICATION

This application claims priority from Japanese Patent Application No. 2010-065499 filed on Mar. 23, 2010, the entire subject matter of which is incorporated herein by reference.

BACKGROUND

Technical Field

The present invention relates to an image processing apparatus that causes a printing executing section to perform a printing process using color-materials.

For example, the related art discloses a technology that corrects an input image data to reduce the amount of toner consumption in printing. In this technology, the correction is performed so that the print-density of an edge part in the input image data maintains the same (i.e., the print-density is not corrected) but the print-density of a non-edge part is lowered. Additionally, the edge part and the non-edge part are distinguished from each other by using a known edge-detecting method, such as a Laplacian filter.

SUMMARY

The above-described technology is possible to reduce the amount of toner consumption, since the non-edge part is corrected so that its print-density is lowered. However, since the print-density of the non-edge part in a printed image is printed by a lower density, it is difficult for the user to perceive the printed image. The present invention provides a printed image, which is easily perceivable to the user with achieving to reduce the amount of color-materials consumption (such as toner in the above example) in printing.

A watercolor effect, which is one of an optical illusion effect, is known. According to the watercolor effect, for example, when an observer sees an image in which the outer periphery of a white area is surrounded by first color (green) and the outer periphery of the green area is surrounded by second color (purple), the observer perceives the white area as if the area is colored with the first color (green). Further, the watercolor effect is possible to also occur when the first color and the second color are achromatic colors (gray) having different print-densities. The present invention is made in consideration of the watercolor effect.

In one aspect of the invention, the image processing apparatus that causes a printing executing section to perform a printing process using color-materials, the image processing apparatus includes: a first processing unit that performs a first image-processing on original image data in order to generate first processed image data; and a supplying unit that supplies the first processed image data to the printing executing section when the first processed image data is generated.

In one exemplary aspect of the invention, the first processing unit includes: a calculating unit that calculates an index value relating an edge-intensity about a target pixel in object image data; and a correcting unit that corrects a value of the target pixel based on the index value, wherein the correcting unit corrects the value of the target pixel such that print-density of the target pixel increase if the target pixel is a first type of pixel, the first type pixel representing that the index value of the target pixel indicates the edge-intensity of the target pixel being relatively high, and wherein the correcting unit corrects the value of the target pixel such that print-density of the target pixel decrease if the target pixel is a second type of pixel, the second type pixel representing that the index value of the target pixel indicates the edge-intensity of the target pixel being relatively low.

Accordingly, although the first type of pixel is corrected so that the value of the first pixel has increased the print-density, the second type of pixel is corrected so that the value of the second pixel has decreased the print-density, so that the amount of a color-material consumption for printing an image is possible to be reduced. Further, because the print-density of the first type of pixel is corrected so that the value of the first pixel is increased, in spite of the print-density of the second type of pixel being corrected to decrease, a user can perceive the print-density of the second type pixel as if the printed image has the print-density higher than actual print-density. That is, a user is possible to perceive watercolor effect. Accordingly, a printed image that is easy to perceive for a user can be acquired while the amount of the color-material consumption is reduced.

In an exemplary aspect of the invention, when the target pixel is the first type of pixel, as the index value of the target pixel indicates the edge-intensity of the target pixel being higher, the correcting unit may correct the value of the target pixel so that the print-density of the target pixel becomes higher. Accordingly, as the edge-intensity of the first pixel becomes higher, a user can perceive the watercolor effect with respect to the printed image expressed by the second pixel.

In an exemplary aspect of the invention, when the target pixel is the second type of pixel, the correcting unit may correct the value of the target pixel in order that the print-density of the target pixel is equal to or less than a predetermined density.

In an exemplary aspect of the invention, the image processing apparatus may include: a second processing unit that performs a second image-processing by processing the original image data in order to generate in order in order to generate second processed image data, wherein the supplying unit supplies the second processed image data to the printing executing section when the second processed image data is generated, wherein the printing executing section is capable of performing the printing process in a first mode or a second mode, wherein, if the first mode is selected, the first processing unit performs the first image-processing, wherein, if the second mode is selected, the second processing unit performs the second image-processing, wherein, when the target pixel is the first type of pixel, the correcting unit corrects the value of the target pixel so that the print-density of the target pixel to be printed in the first mode is higher than that of the target pixel to be printed in the second mode, wherein, when the target pixel is the second type of pixel, the correcting unit corrects the value of the target pixel so that the print-density of the target pixel to be printed in the first mode is lower than that of the target pixel to be printed in the second mode. Accordingly, the amount of color-material consumption is possible to be reduced in the first mode printing, compared to case that the printing process is performed in the second mode. Further, in case that the printing process is performed in the first mode, a printed image that is perceivable for a user is possible to be provided.

In an exemplary aspect of the invention, the correcting unit may include a determination unit that determines whether the target pixel is the first type pixel or the second type pixel by comparing the index value of the target pixel with a threshold value.

In one exemplary aspect of the invention, an image processing apparatus that causes a printing executing section to perform a printing process using a color-material, includes a first processing unit that performs a first image-processing by processing original image data in order to generate in order in order to generate first processed image data; and a supplying unit that supplies the first processed image data to the printing executing section when the first processed image data is generated, wherein the first processing unit comprises: a detecting unit that detects a boundary between a first region and a second region, wherein the first region and the second region are included in a object image represented by object image data to be processed, the first region and the second region are adjacent to each other, and a value of a first pixel group included in the first region, is different from a value of second pixel group included in the second region; and a correcting unit correcting the value of the first pixel group included in the first region, wherein the correcting unit corrects a value of first adjacent pixels, which are a part of the first pixel group and located adjacent to the second region, such that the print-density of the first adjacent pixels increase, and wherein the correcting unit corrects a value of first not-adjacent pixels, which are a part of the first pixel group and located apart from the second region such that the print-density of the first not-adjacent pixels decrease.

Accordingly, although the first adjacent pixels are corrected to increase the print-density, the first not-adjacent pixels are corrected to decrease the print-density, so that the amount of color-material consumption for printing an image is possible to be reduced. Further, because the print-density of the first adjacent pixels is corrected to increase, in spite of the print-density of the first not-adjacent pixels being corrected to reduce, a user can perceive the print-density of the first not-adjacent pixels as if the printed image has the print-density higher than actual print-density. That is, a user can perceive a watercolor effect. Accordingly, a printed image that is easy for a user to perceive is possible to be acquired while the amount of a color-material consumption is reduced.

In an exemplary aspect of the invention, the print-density of the first pixel group that is indicated by a not yet corrected value of the first pixel group may be lower than the print-density of the second pixel group that is indicated by a not yet corrected value of the second pixel group.

In an exemplary aspect of the invention, the correcting unit corrects the value of the second pixel group, wherein the correcting unit corrects a value of second adjacent pixels, which are a part of the second pixel group and located adjacent to the first region such that the print-density of the second adjacent pixels increase, and wherein the correcting unit corrects a value of second not-adjacent pixels, which are a part of the second pixel group and located apart from the first region, such that the print-density of the second not-adjacent pixels decrease. Accordingly, although the second adjacent pixels are corrected to increase the print-density, the second not-adjacent pixels are corrected to reduce the print-density, so that the amount of a color-material consumption for printing an image is possible to be reduced. Further, because the print-density of the second adjacent pixels are corrected to increase, in spite of the print-density of the second not-adjacent pixels being corrected to reduce, a user can perceive the print-density of the second not-adjacent pixels as if the printed image has the print-density higher than actual print-density. That is, a user can perceive a watercolor effect. Accordingly, a printed image that is easy for a user to perceive is possible to be acquired while the amount of the color-material consumption is reduced.

In an exemplary aspect, the image processing apparatus may include: a second processing unit that performs a second image-processing by processing the original image data in order to generate in order in order to generate second processed image data, wherein, the supplying unit supplies the second processed image data to the printing executing section when the second processed image data is generated, wherein the printing executing section is capable of performing the printing process in a first mode or a second mode, wherein, if the first mode is selected, the first processing unit performs the first image-processing, wherein, if the second mode is selected, the second processing unit performs the second image-processing, wherein the correcting unit corrects the value of the first adjacent pixels in order that the print-density of the first adjacent pixels to be printed in the first mode is higher than the print-density of the first adjacent pixels to be printed in the second mode, and wherein the correcting unit corrects the value of the first not-adjacent pixels in order that the print-density of the first not-adjacent pixels to be printed in the first mode is lower than the print-density of the first not-adjacent pixels to be printed in the second mode. Accordingly, the amount of color-material consumption is possible to be reduced in the first mode printing, compared to a case that the printing process is performed in the second mode. Further, in a case that the printing process is performed in the first mode, a printed image that is perceivable for a user can be provided.

Additionally, the present disclosure also provides new, useful control method, computer program, and memory medium readable by a computer storing the computer program, all of which realize the image processing apparatus according to the first and second exemplary embodiments.

DETAILED DESCRIPTION OF EXEMPLARY EMBODIMENT (Configuration of System)

Figure 1:
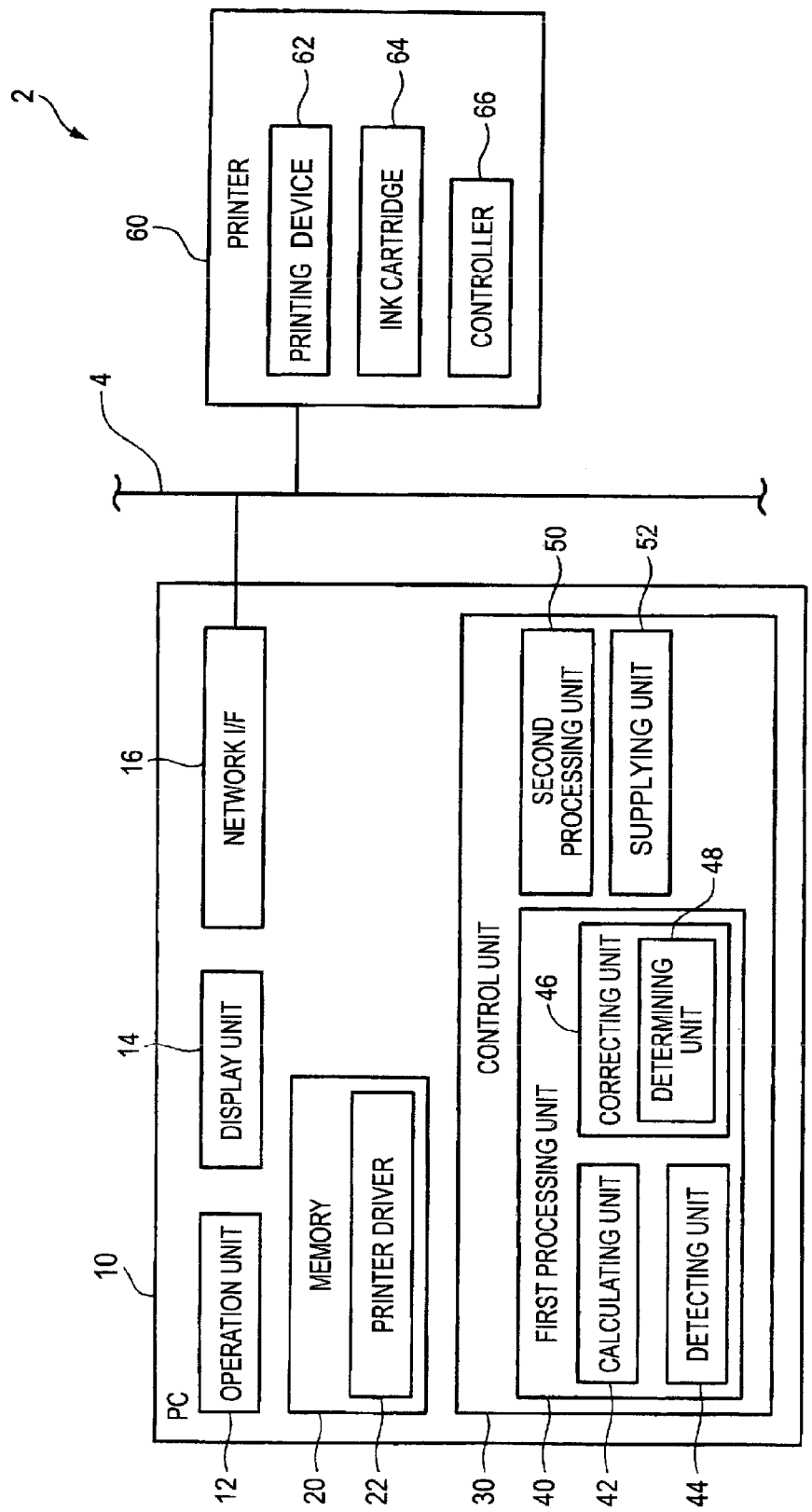
FIG. 1 is a schematic view showing the configuration of a communication system.

An exemplary embodiment is described with reference to the drawings. As shown in FIG. 1, a communication system 2 includes a PC 10 and a printer 60. The PC 10 and the printer 60 can communicate with each other via a LAN cable 4.

(Configuration of PC 10)

The PC 10 includes an operation unit 12, a display unit 14, a network interface 16, memory 20, and a control unit 30. The operation unit 12 includes a mouse and keyboard. A user can input a variety of instructions to the PC by operating the operation unit 12. The display unit 14 is a display that displays various information. The network interface 16 is connected to the LAN cable 4. The memory 20 stores a printer driver 22 for the printer 60. The printer driver 22 may be installed from a storage medium in the PC 10, which is possible to be read by a computer in which the driver 22 is stored, or may be installed 10 from a server on the Internet in the PC.

The control unit 30 executes several processes by using the printer driver 22 stored in the memory 20. The functions of a first processing unit 40, a second processing unit 50, and a supplying unit 52 are realized by using the control unit 30 executing the processes by the printer driver 22. The first processing unit 40 includes a calculating unit 42, a detecting unit 44, and a correcting unit 46. The correcting unit 46 includes a determining unit 48.

(Configuration of Printer 60)

The printer 60 includes a printing device 62, an ink cartridge 64, and a control unit 66. The printing device 62 includes an inkjet head and an actuator that drives the inkjet head. The printing device 62 executes printing using 4 color inks, which are CMYK (i.e. Cyan, Magenta, Yellow, and Black) color and are supplied from the ink cartridge 64. The control unit 66 actuates the printing device 62 according to a program, which is not shown.

(Processes Executed by PC 10)

Hereinafter, the processes executed by the control unit 30 of the PC 10 will be described. The user can select an intended data and operate a print instruction operation to the operation unit 12 so that the printer 60 prints an image, which is expressed by the intended data. In this exemplary embodiment, it will be described the case that an RGB (i.e. Red, Green Blue) bitmap image data (hereinafter, referred to as an "RGB image data") is selected by the user. If a different type of data (e.g., a text data, a bitmap image data other than RGB image, a data combined text and bitmap, or the like) is selected, the control unit 30 coverts the data, which is selected by the user, into an RGB image data using a known method. In the meantime, the print instruction operation includes a mode selection operation and a print resolution selection operation. In the mode selection operation, an intended mode is selected from a normal mode and an ink save mode, which the printer 60 can execute. In the print resolution selection operation, one print resolution is selected from a plurality of print resolutions.

Figure 2:
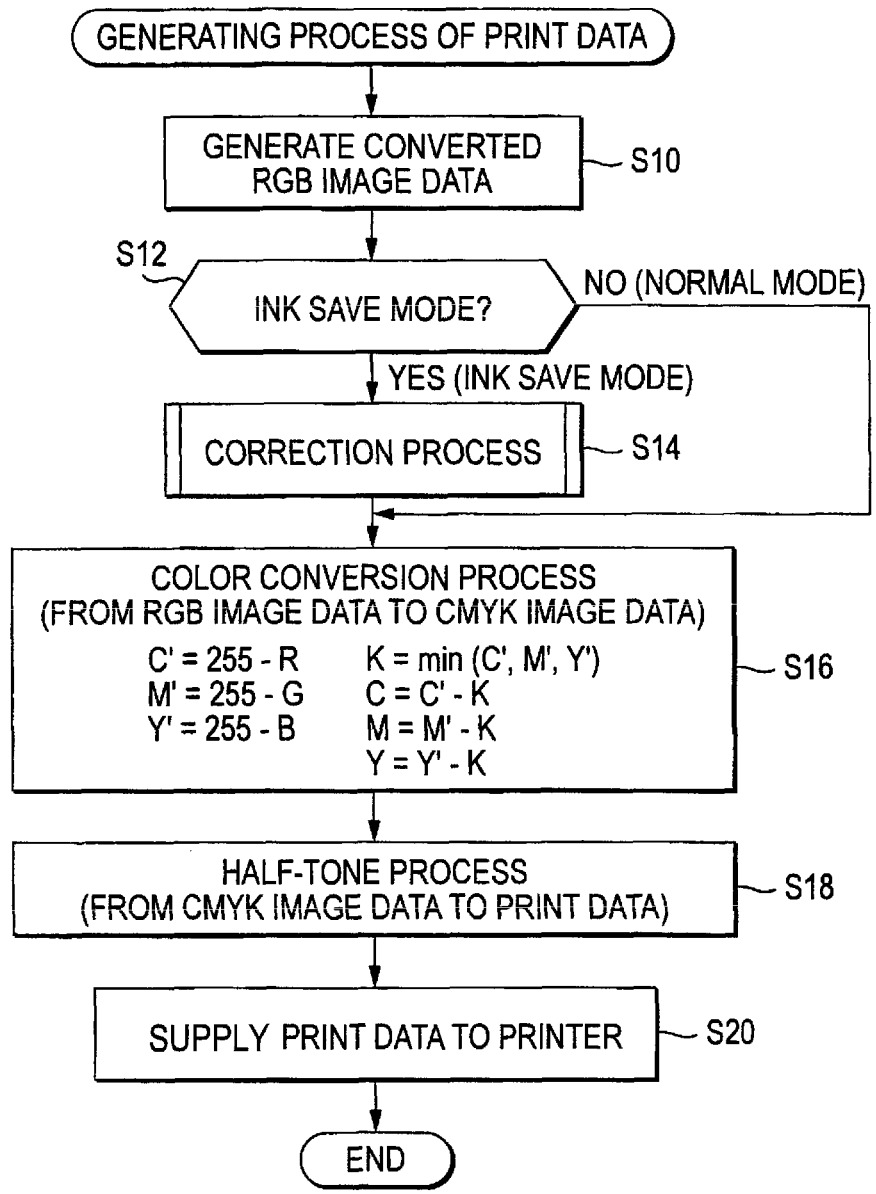
FIG. 2 is a view showing a flowchart of a process of generating print data.
Figure 4:
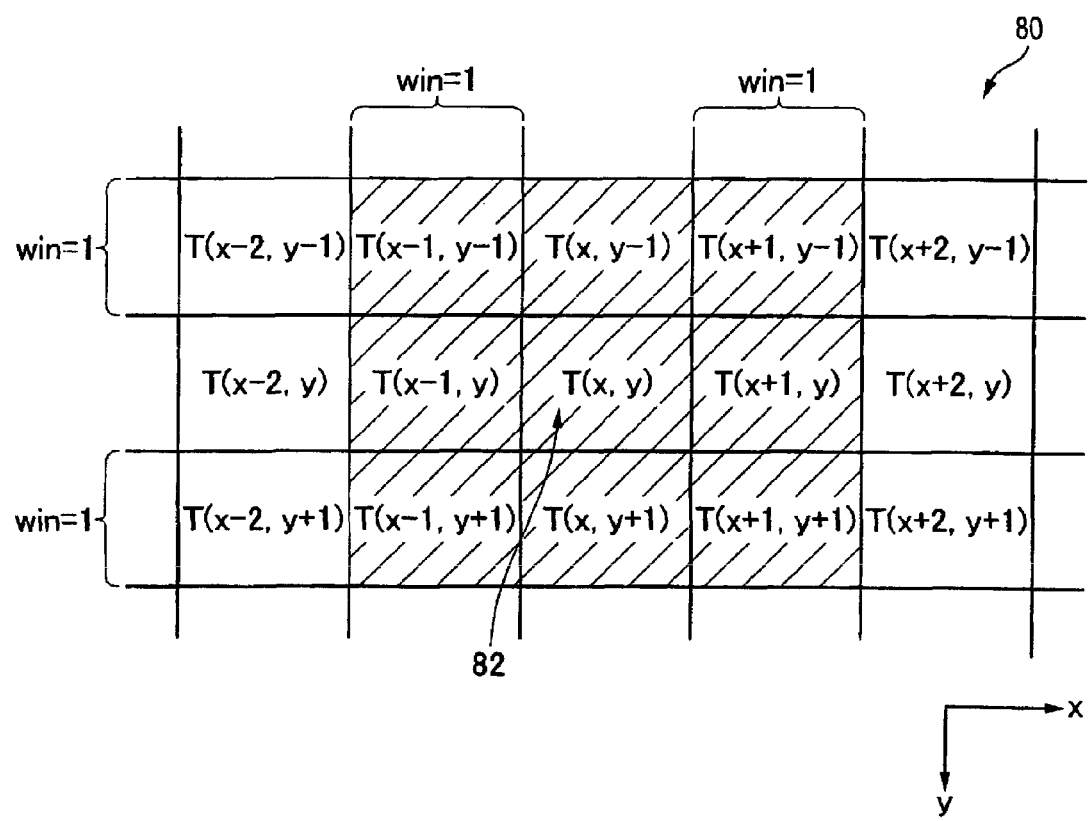
FIG. 4 is a schematic view showing respective pixels in a converted RGB image data.

When the print instruction operation is executed, the control unit 30 executes a print data generation process, which is shown in FIG. 2, according to the printer driver 22. The control unit 30, first, generates a converted RGB image data by executing a resolution conversion process on the RGB image data by using a known method (step S10). In the resolution conversion process, a resolution of the RGB image data is converted to a resolution corresponding to a print resolution, which is selected through the print resolution selection operation. As shown in FIG. 4, the converted RGB image data 80 includes a plurality of pixels, and the plurality of pixels configures a plurality of rows and a plurality of columns. That is, one row is configured by a plurality of pixels arrayed along the horizontal direction (x direction) of FIG. 4, and one column is configured a plurality of pixels arrayed along the vertical direction (y direction) of FIG. 4. Each pixel includes Red (R), Green (G), and Blue (B) values. Each of the R, G, and B values has a multiple value data having 256 tones (0 to 255).

Next, the control unit 30 determines whether the selected mode is an ink save mode (step S12). Here, in the case of YES (the ink save mode is selected), the first processing unit 40 executes a correction process in step S14, a color conversion process in step S16, and a halftone process in step S18 based on the converted RGB image data. In the meantime, if NO is selected in step S12 (the normal mode is selected), the second processing unit 50 executes the color conversion process in step S16 and the halftone process in step S18 based on the converted RGB image data, without executing the correction process in step S14.

(Correction Process)

Figure 3:
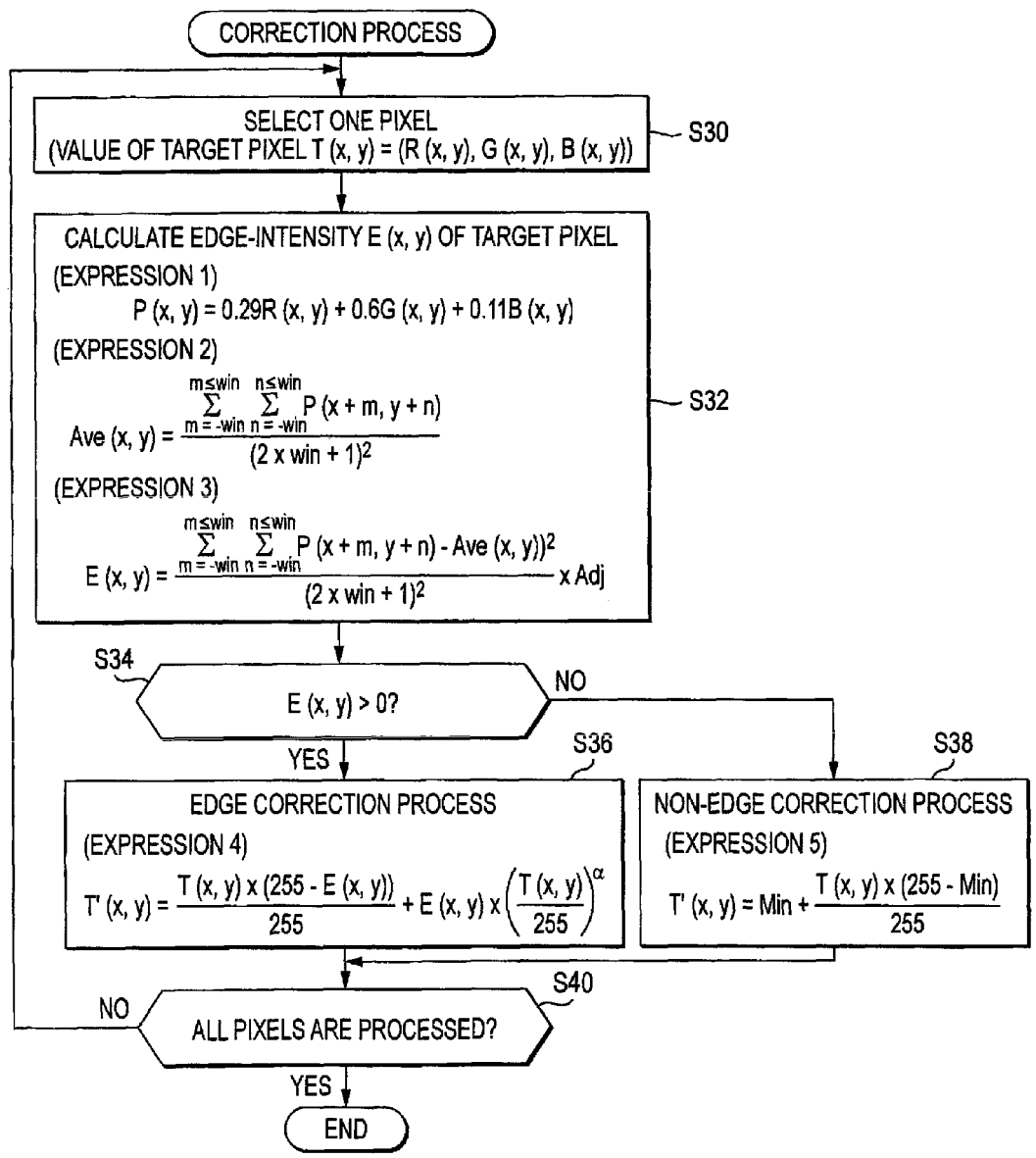
FIG. 3 is a view showing a flowchart of a correction process.

Referring to FIG. 3, the details of the correction process in step S14 will be described. The first processing unit 40 selects one pixel from a plurality of pixels in the converted RGB image data 80 (step S30). Hereinafter, a pixel selected in step S30 is referred to as an "target pixel", and R, G, and B values of the target pixel are expressed as "T(x, y)", all together. More specifically, the R, G, and B values of T(x, y) are respectively R(x, y), G(x, y), and B(x, y).

Subsequently, the calculating unit 42 calculates an edge-intensity E(x, y) of the target pixel (step S32). In this exemplary embodiment, the edge-intensity E(x, y) is expressed as a numeric value in the range from 0 to 255.

First, the calculating unit 42 calculates a luminance-related value P of each of a plurality of object pixels, which includes the target pixel and a group of specific pixels located around the target pixel. In the meantime, Expression 1 (as described below) in step S32 in FIG. 3 indicates a formula for calculating the luminance-related value P(x, y) of the target pixel.

$$P(x,y)=0.29R(x,y)+0.6G(x,y)+0.11B(x,y) \qquad \text{Expression 1}$$

It is possible to calculate the luminance-related value of a pixel other than the target pixel by substituting (x, y) in Expression 1 with other coordinates. For example, by substituting (x, y) in Expression 1 with (x+1, y), which is immediately right of the target pixel, a formula for calculating the luminance-related value P(x+1, y) of a pixel (coordinates (x+1, y)) is acquired.

Additionally, As described in Expression 1 in FIG. 3, as the RGB values of a pixel in the converted RGB image data 80 are lower, the luminance-related value P of the pixel becomes lower. However, as described by Expression 6 (it will be described later) in step S16 in FIG. 2, as the RGB values of the pixel in the converted RGB image data 80 is lower, the CMYK values of the pixel becomes higher. As the CMYK values of the pixel are higher, the print-density of the area corresponding to the pixel in the printed image becomes higher (the size of the dot corresponding to the pixel increases). That is, as the RGB values of the pixel in the RGB image data are lower (i.e., as the luminance-related value of the pixel is lower), the print-density of the area corresponding to the pixel in the printed image becomes higher. On the other hand, as the RGB values of the pixel in the RGB image data are higher (the luminance-related value of the pixel is higher), the print-density of the area corresponding to the pixel in the printed image becomes lower. As described above, the RGB values of the pixel in the RGB image data 80 is related to the print-density of the area corresponding to the pixel in the printed image. Therefore, the print-density of the area corresponding to the pixel in the printed image in the RGB image data 80 may be referred to as a "print-density expressed by the RGB values of the corresponding pixel". More briefly, the print-density of the area corresponding to the pixel in the printed image in the RGB image data 80 may be referred to as a "print-density of the corresponding pixel". Hereinafter, the expression "print-density of the pixel" will also be used in some cases.

A group of the specific pixels (a group of pixels arranged adjacent to the target pixel is determined by a parameter "win" (win is an integer of 1 or more) in Expression 2 (as described below) in step S32.

$$Ave(x, y) = \frac{\sum_{m=-win}^{m \leq win} \sum_{n=-win}^{n \leq win} P(x+m, y+n)}{(2 \times win + 1)^2} \quad \text{Expression 2}$$

The value of the parameter win is determined previously by a manufacturer of the printer 60 (or the printer driver 22). In general, a plurality of pixels, which is surrounded by a column corresponding to (x+win); a column corresponding to (x−win); a row corresponding to (y+win); and a row corresponding to (y−win), are a plurality of object pixels (a plurality of pixels the luminance-related values of which are calculated). The number of object pixels is $(2 \times win+1)^2$. The pixels excepting for the target pixel in a plurality of the object pixels is a group of the specific pixels. The number of specific pixels is $((2 \times win+1)^2−1)$. For example, in case that (win=1) as shown in FIG. 4, nine pixels that are included by: a column corresponding to (x+1); a column corresponding to (x−1); a row corresponding to (y+1); and a row corresponding to (y−1), are a group of the object pixels (the nine object pixels are hatched in FIG. 4). Therefore, among the nine pixels, 8 pixels, which does not include the target pixel 82, are a group of the specific pixels. In case that (win=1), the calculating unit 42 calculates the luminance-related value of each of the nine object pixels.

Afterwards, the calculating unit 42 calculates an average Ave(x, y) of the luminance-related values P of a plurality of the object pixels (the 9 object pixels in FIG. 4) according to Expression 2 in step S32. In addition, the calculating unit 42 calculates an edge-intensity E(x, y) of the object pixel according to Expression 3 (as described below) in step S32.

$$E(x, y) = \frac{\sum_{m=-win}^{m \leq win} \sum_{n=-win}^{n \leq win} (P(x+m, y+n) - Ave(x, y))^2}{(2 \times win + 1)^2} \times Adj \quad \text{Expression 3}$$

As expressed by Expression 3, the edge-intensity E(x, y) is a value calculated by multiplying a dispersion of the luminance-related values of a plurality of the object pixels (the 9 object pixels in FIG. 4) by a parameter Adj. The parameter Adj is a parameter for adjusting the value of the edge-intensity. In the exemplary embodiment, the Adj is a constant value of "0.25", which is predetermined by a manufacturer of the printer 60. Generally, the Adj value is a value higher than "0". Additionally, the Adj value may not be a constant value and may be a value that changes according to the converted RGB image data to be processed. For example, the control unit 30 may determine the Adj value of each the pixels in order that each edge-intensity E(x, y) of each pixels in the converted RGB image data is to be come in the range from 0 to 255.

As described above, generally, the edge-intensity E(x, y) of the target pixel indicates the variation (which is dispersion in the present exemplary embodiment) of the luminance-related values of a plurality of the object pixels (the 9 object pixels in FIG. 4). The edge-intensity E(x, y) increases with an increase in the variation. Therefore, in case that both a low print-density area having a relatively low print-density (i.e., high luminance) and a high print-density area having a relatively high-print-density (i.e., low luminance) are adjacent to each other in an image expressed by the converted RGB image data, if a target pixel is close to the boundary between the two areas, the edge-intensity E(x, y) of the target pixel is increased. In the above case, if the target pixel is apart from the boundary (i.e., the central portion of each of the areas), the edge-intensity E(x, y) of the target pixel is decreased. In other words, the edge-intensity E(x, y) of the target pixel may be referred to as a value that indicates the distance from the boundary to a partial image represented by the target pixel. The edge-intensity E(x, y) increases with decreasing the distance.

In sequence, the determining unit 48 determines whether the edge-intensity E(x, y) of the target pixel is higher than zero (step S34). Here, in the case of YES (i.e., (E(x, y)>0), the correcting unit 46 executes an edge correction process (step S36). On the other hand, in the case of NO (i.e., E(x, y)=0) in step S34, the correcting unit 46 executes a non-edge correction process (step S38). Additionally, a pixel determined to be YES in step S34 is referred to as an "edge pixel", and a pixel determined to be NO in step S34 is referred to as a "non-edge pixel".

As described above, in case that the low print-density area and the high print-density area are adjacent to each other in an image expressed by the converted RGB image data 80, if the target pixel is close to the boundary between the two areas, the determining unit 48 determines a determination as YES in step S34, and if the target pixel is apart from the boundary, the determining unit 48 determines a determination as NO in step S34. That is, the processes in step S32 and step S34 is processes of detecting the boundary. In other words, the detecting unit 44 detects the boundary by executing the processes in step S32 and step S34.

(Edge Correction Process)

In the edge correction process of step S36, the correction unit 46 corrects a pre-correction value T(x, y) of the target pixel (i.e. the edge pixel) on the basis of Expression 4 (as described below) of step S36 in FIG. 3, thereby calculating a post-correction value T'(x, y) of the target pixel.

$$T'(x, y) = \frac{(T(x, y) \times (255 - E(x, y)))}{255} + E(x, y) \times \left(\frac{(T(x, y))}{255}\right)^\alpha \quad \text{Expression 4}$$

Meanwhile, the parameter α of Expression 4 is a parameter for adjusting an amount of correction. In the present exemplary embodiment, the parameter a is a constant value "1.5" predetermined by a manufacturer of the printer 60. Further, a value of α is preferably "1" or more. First, the correction unit 46 calculates a post-correction R value (i.e. R'(x, y) value) according to Expression 4 based on a pre-correction R value (i.e. R(x, y)) included in the pre-correction value T(x, y) of the target pixel. Similarly, the correction unit 46 also calculates a post-correction G value (i.e., G'(x, y)) and a post-correction B value (i.e., B'(x, y)) according to Expression 4 based on a pre-correction G value (i.e., G(x, y)) and a pre-correction B value (i.e., B(x, y)), respectively. Thereby, the post-correction value T'(x, y) (i.e. R'(x, y), G'(x, y), and B'(x, y)) of the target pixel is calculated.

Figure 5:
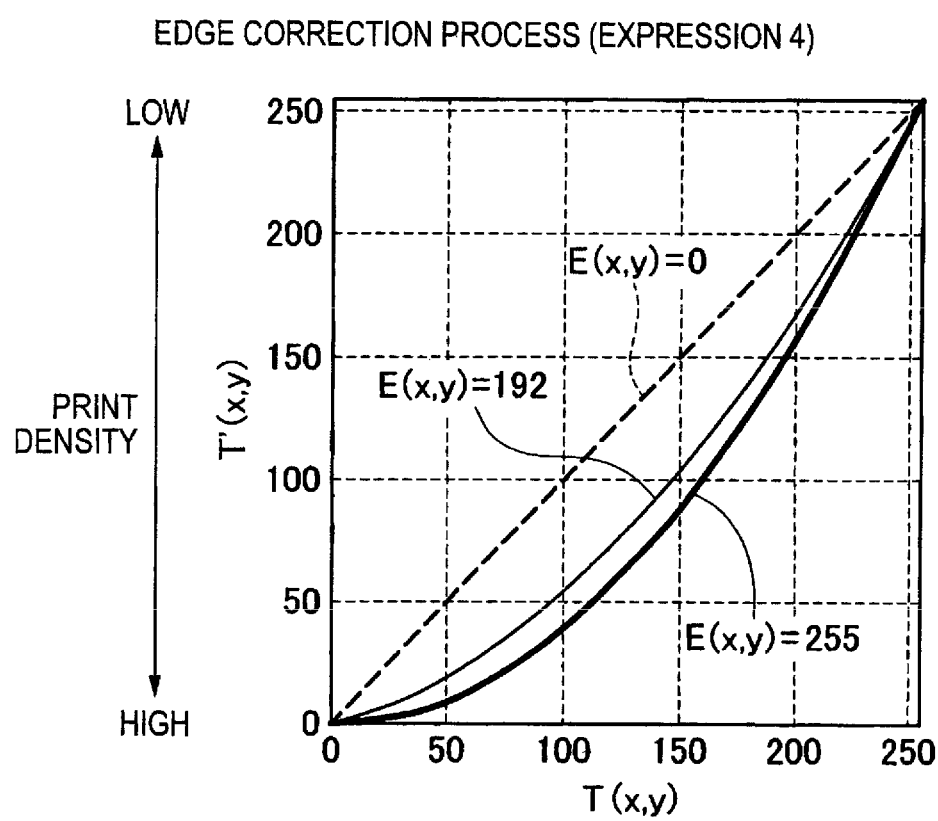
FIG. 5 is a graph showing values before and after an edge correction process.

FIG. 5 is a view showing a relationship between the pre-correction value T(x, y) of the target pixel and the post-correction value T'(x, y) of the target pixel that is acquired by the edge correction process of step S36. In FIG. 5, a graph acquired when (E(x, y)=192) and a graph acquired when (E(x, y)=255) are illustrated, as examples. Further, since the determination in step S34 of FIG. 3 results in NO when E(x, y)=0, the edge correction process of step S36 is not performed. However, in FIG. 5, the graph acquired when (E(x, y)=0) is also shown for reference. As described in FIG. 5, in the edge correction process of step S36, the post-correction value T'(x, y) is corrected to be lower than the pre-correction value T(x, y). As described above, reducing of the RGB values of the pixel means that the print-density of the pixel is increased. That is, in the edge correction process of step S36, the pre-correction value T(x, y) of the target pixel is corrected in order that the print-density of the target pixel is increased. Further, as described in FIG. 5, when (E(x, y)=255), the amount of correction (i.e., |T'(x, y)−T(x, y)|) is large compared to a case that (E(x, y)=192). That is, in the edge correction process of step S36, the pre-correction value T(x, y) of the target pixel is corrected in order that the amount of correction (i.e. the reduced amount of the RGB value) is increased with increasing edge-intensity E(x, y) of the target pixel. In other words, in the edge correction process of step S36, the pre-correction value T(x, y) of the target pixel is corrected in order that the print-density of the target pixel is increased with increasing edge-intensity E(x, y) of the target pixel.

(Non-Edge Correction Process)

In the non-edge correction process of step S38, the correction unit 46 corrects a pre-correction value T(x, y) of the target pixel (i.e. the non-edge pixel) on the basis of Expression 5 (as described below) of step S38, thereby calculating a post-correction value T'(x, y) of the target pixel.

$$T'(x, y) = \text{Min} + \frac{(T(x, y) \times (255 - \text{Min}))}{255} \quad \text{Expression 5}$$

Meanwhile, the parameter Min of Expression 5 is a parameter for adjusting a print-density of the target pixel. In the exemplary embodiment, the parameter Min, which is a constant value and is predetermined by a manufacturer of the printer 60, is "192". As in the edge correction process of step S36, the correction unit 46 calculates post-correction R, G and B values according to Expression 5 based on pre-correction R, G and B values included in the pre-correction value T(x, y) of the target pixel. Consequently, the post-correction value T'(x, y) (i.e., R'(x, y), G'(x, y), and B'(x, y)) of the target pixel is calculated.

Figure 6:
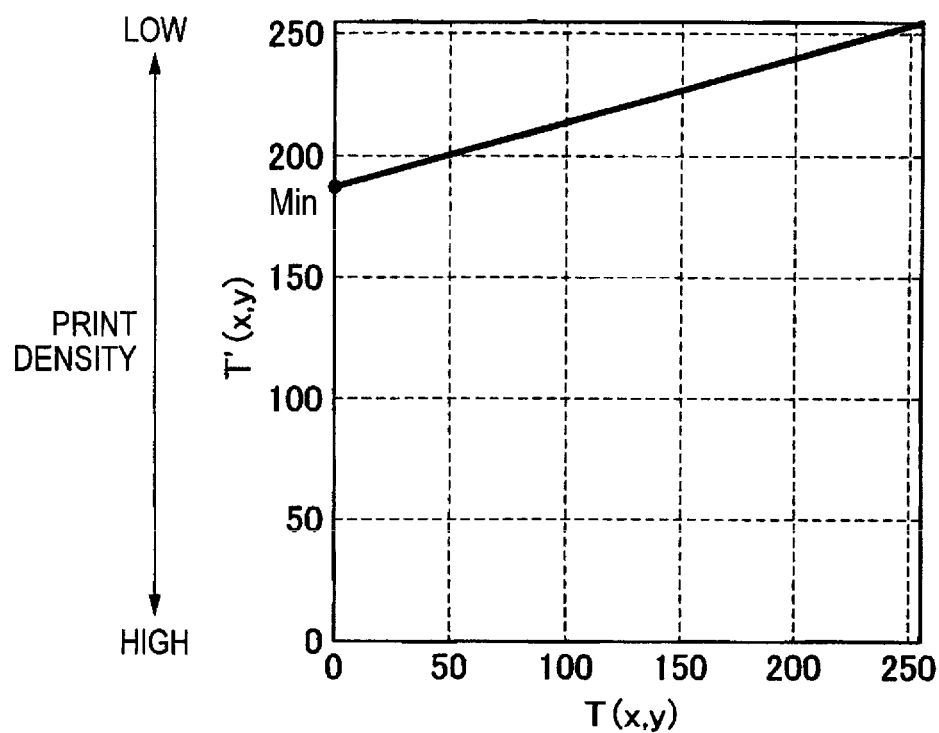
FIG. 6 is a graph showing values before and after a non-edge correction process.

FIG. 6 shows a relation between the pre-correction value T(x, y) of the target pixel and the post-correction value T'(x, y) of the target pixel which is acquired by the non-edge correction process of step S38. As described in the non-edge correction process of step S38 of FIG. 6, the post-correction value T'(x, y) is corrected to be higher than the pre-correction value T(x, y). As described above, increasing of the RGB values of the pixel means that the print-density of the pixel is decreasing. That is, in the non-edge correction process of step S38, the pre-correction value T(x, y) of the target pixel is corrected to decrease the print-density of the target pixel. Further, as described in FIG. 6, in the present exemplary embodiment, the post-correction value T'(x, y) of the target pixel has a value of Min (i.e. 192) or more, regardless of a magnitude of the pre-correction value T(x, y) of the target pixel. That is, in the non-edge correction process of step S38, the pre-correction value T(x, y) of the target pixel is corrected in order that the print-density of the target pixel is equal to or less than the print-density corresponding to Min.

When step S36 or step S38 is ended, the first processing unit 40 determines whether the processes of step S30 to step S38 are performed on all the pixels in the converted RGB image data 80 (step S40). Here, in case that the determination is NO, the first processing unit 40 returns to step S30, and then selects one pixel, which has not yet been processed, included in the plurality of pixels in the converted RGB image data 80.

On the other hand, in case that the determination is YES in S40, the correction process is ended.

As shown in FIG. 2, the first processing unit 40 performs color conversion on the converted post-correction RGB image data acquired by the correction process of step S14 by using a known technique when the correction process of step S14 is ended (step S16). In step S16, the first processing unit 40 converts the converted post-correction RGB image data into CMYK bitmap image data (hereinafter, referred to as "first CMYK image data"). One pixel described in a CMYK format is acquired from one pixel of the converted post-correction RGB image data. That is, the number of pixels in the first CMYK image data is equal to the number of pixel of the converted post-correction RGB image data. Each pixels in the first CMYK image data includes C, M, Y and K values, and each of the C, M, Y and K values is a multi-valued data having 256 tones (from 0 to 255).

Expression 6 (as described below) of step S16 indicates an expression for converting the values (R, G and B of Expression 6) of the pixel described in the RGB format into the values (C, M, Y and K of Expression 6) of the pixel described in the CMYK format.

$$C'=255-R, M'=255-G, Y'=255-B, K=\min(C',M',Y')$$

$$C=C'-K, M=M'-K, Y=Y'-K \quad \text{Expression 6}$$

Additionally, C', M' and Y' of Expression 6 are intervening parameters for calculating C, M, Y and K. Further, min (C', M', Y') of Expression 6 indicates a minimum value among C', M' and Y'. As described in Expression 6, as the RGB values are higher, the CMYK values become lower, and as the RGB values are lower, the CMYK values become higher.

After that, the first processing unit 40 performs halftone processing on the first CMYK image data using a known technique (step S18). An example of the halftone processing may include an error diffusion method, a dither method, or the like. In step S18, the first processing unit converts the first CMYK image data into four-valued bitmap image data (hereinafter, referred to as "first print data"). One pixel indicated by four-values is acquired from one pixel in the first CMYK image data. That is, the number of pixels of the first print data is equal to that of the first CMYK image data. A value "3" in the four-values indicates the formation of a large-sized dot, a value "2" indicates the formation of a medium-sized dot, a value "1" indicates the formation of a small-sized dot, and a value "0" indicates the formation of no dot. Each pixel in the print data includes values (any one of 0 to 3) corresponding respectively to C, M, Y, and K.

For example, when the C value of the pixel in the first CMYK image data has a value within a first range (e.g., 0 to 63), the first processing unit 40 determines that the pixel in the first print data is corresponding to value "0". Similarly, when the C values of the pixel in the first CMYK image data have a value within a second range (e.g., 64 to 127), a value within a third range (e.g., 128 to 191), and a value within a fourth range (e.g., 192 to 255) respectively, the first processing unit 40 is possible to determine that the pixel in the first print data is corresponding to values "1", "2", and "3" respectively. Similarly, the first processing unit 40 may determine values corresponding to M, Y and K of the pixel in the first print data corresponding to pixels based on the M, Y and K values of the pixel in the first CMYK image data.

Next, the supplying unit 52 supplies the first print data generated by the first processing unit 40 to the printer 60 (step S20). Thereby, the controller 66 of the printer 60 causes the printing device 62 to print based on the first print data. The controller 66 controls the printing device 62 in order that the dots of the respective colors are formed at positions according to the first print data, based on the values (values corresponding to C, M, Y and K) of the pixel in the first print data. For example, the controller 66 controls the printing device 62 in order that, when the value of the pixel in the first print data is "3", a large-sized cyan dot is to be formed.

Meanwhile, when the determination in step S12 is NO, the second processing unit 50 does not perform the correction process in step S14, and performs the color conversion process in step S16 on the converted RGB image data 80 generated in step S10 as described above, thereby generating a second CMYK image data. Next, the second processing unit 50 performs the halftone processing of step S18 on the second CMYK image data as described above, thereby generating a second print data. The supplying unit 52 supplies the second print data generated by the second processing unit 50 to the printer 60.

As described above, if it is determined that an ink save mode is selected in step S12 (the determination in step S12 is YES), the first processing unit 40 performs the correction process of step S14 in order to generate the first print data. If it is determined that a normal mode is selected in step S12 (the determination in step S12 is NO), the second processing unit 50 generates the second print data without performing the correction process of step S14. In the correction process of step S14, the value of the edge pixel is corrected to increase the RGB value of the edge pixel (i.e. the print-density of the edge pixel is increased). The value of the non-edge pixel is corrected to increase the RGB value of the non-edge pixel (i.e., the print-density of the edge pixel is decreased). Thus, after the correction process is performed on the converted RGB image data 80, the RGB value of the edge pixel is decreased (i.e., the print-density of the edge pixel is increased), and the RGB value of the non-edge pixel is increased (i.e., the print-density of the edge pixel is decreased), compared to a case that the correction process is not performed. Accordingly, after the first CMYK image data is generated from the converted post-correction RGB image data, the CMYK values of the pixel corresponding to the edge pixel in the first CMYK image data are increased, and the CMYK values of the pixel corresponding to the non-edge pixel in the first CMYK image data are reduced, compared to a case that the correction process is not performed. Further, when the first print data is generated from the first CMYK image data, the values of the pixel corresponding to the edge pixel in the first print data are increased (i.e., the dot size is increased), and the values of the pixel corresponding to the non-edge pixel in the first print data are reduced (i.e., the dot size is reduced), compared to a case that the correction process is not performed.

Typically, the converted RGB image data 80 acquired from document data made up of characters or tables includes the non-edge pixels more than the edge pixels. Thus, when the first print data is generated by the first processing unit 40 in the document data, the size of the dots corresponding to relatively few edge pixels is increased, and the size of the dots corresponding to relatively many non-edge pixels is reduced, compared to a case that the second print data is generated by the second processing unit 50. As a result, when the printer 60 performs printing based on the first print data (i.e. printing in the ink save mode), an amount of ink consumption is possible to be reduced, compared to a case that the printer 60 performs printing based on the second print data (i.e. printing in the normal mode).

Figure 7:
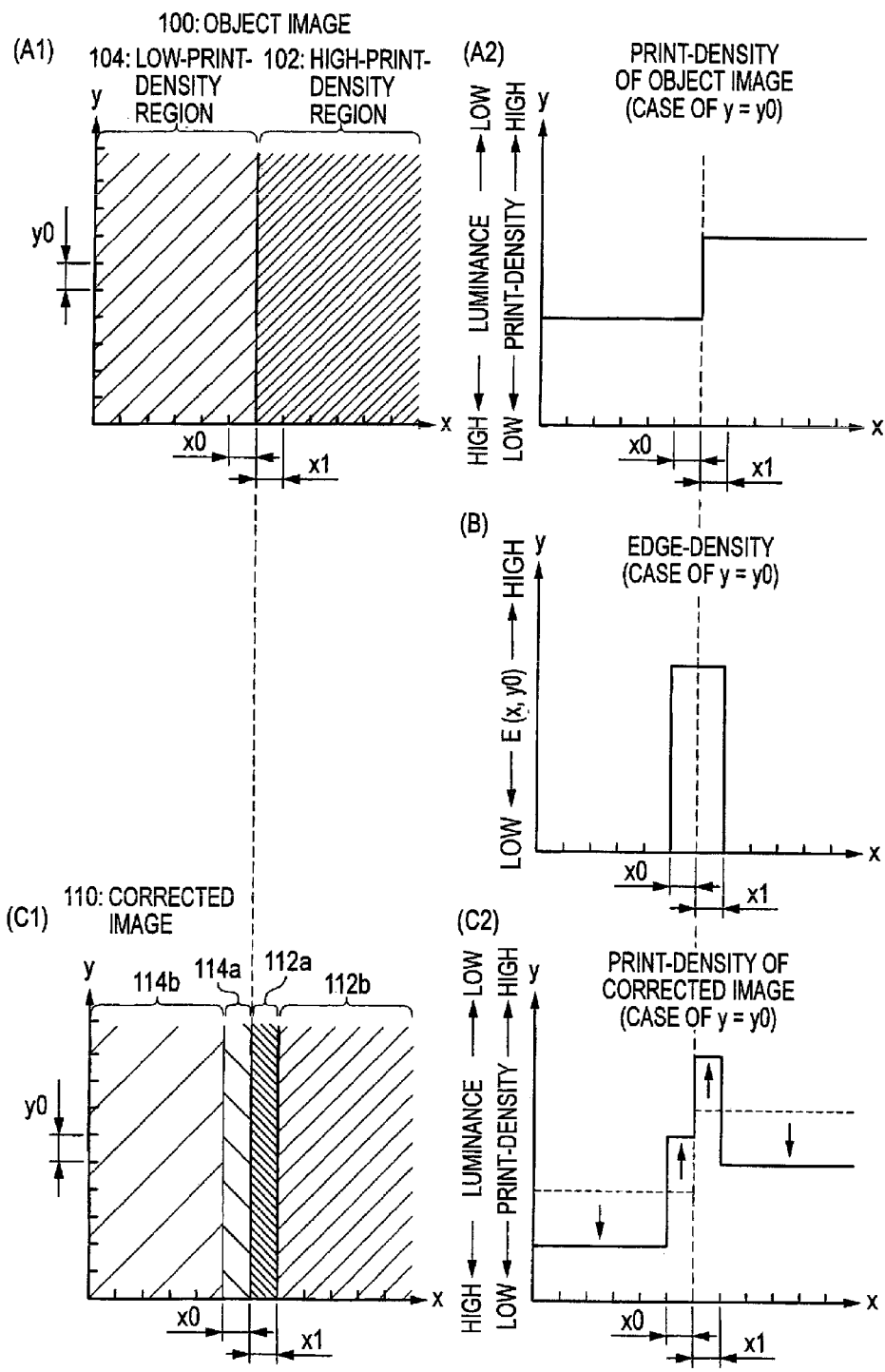
FIG. 7 is a view explaining a correction process in one exemplary embodiment.

FIG. 7(A1), which is a part of FIG. 7 and the indication means a part (A1) of FIG. 7, schematically shows an image 100 (hereinafter, referred to as "object image 100") represented by the converted RGB image data 80 acquired in step S10 of FIG. 2. Each one coordinate of x direction and y direction corresponds to each one pixel. The object image 100 includes a high-print-density region 102 having a relatively high print-density and a low-print-density region 104 having a relatively low print-density. The high-print-density region 102 abuts on the low-print-density region 104. The values of each pixel included in the high-print-density region (i.e., low luminance region) 102 are equal (e.g. R=10, G=20, B=30), and the values of each pixel included in the low-print-density region (i.e., high luminance region) 104 are equal (e.g. R=200, G=210, B=220). FIG. 7(A2) shows a print-density (luminance) of each pixel in a row of (y=y0), included in a plurality of pixels in the object image 100.

FIG. 7(B) shows an edge-intensity of each pixel in a row of (y=y0), included in a plurality of pixels in the object image 100. In the present exemplary embodiment, since the parameter win in Expressions 2 and 3 of FIG. 3 is "1", one pixel apart from the boundary between the high-print-density region 102 and the low-print-density region 104 has the edge-intensity higher than "0", so that this pixel is determined as the edge pixel. That is, on the side of the high-print-density region 102, each pixel in a column of (x=x1) adjacent to the boundary is determined as the edge pixel. Similarly, on the side of the low-print-density region 104, each pixel in a column of (x=x0) adjacent to the boundary is determined as the edge pixel. The edge correction process is applied these edge pixels to increase the print-density (see step S36 of FIG. 3). On the other hand, each pixel, which is not included in the column of (x=x1), in the high-print-density region 102, and each pixel, which is not included in the column of (x=x0), in the low-print-density region 104 are determined as non-edge pixels. The non-edge correction process is applied to these non-edge pixels to decrease the print-density (see step S38 of FIG. 3).

FIG. 7(C1) shows schematically an image 110 (hereinafter, referred to as "post-correction image 110") represented by the converted post-correction RGB image data acquired in step S14 of FIG. 2. In the post-correction image 110, the print-density of each edge pixel (x=x1, x=x0) is increased, compared to the object image 100. That is, the print-density of a region 112a (x=x1) of the post-correction image 110 is higher than that of the high-print-density region 102 of the object image 100. Meanwhile, the print-density of a region 114a (x=x0) of the post-correction image 110 is higher than that of the low-print-density region 104 of the object image 100. On the other hand, in the post-correction image 110, the print-density of each non-edge pixel is reduced, compared to the object image 100. That is, the print-density of a region 112b of the post-correction image 110 is lower than that of the high-print-density region 102 of the object image 100, and the print-density of a region 114b of the post-correction image 110 is lower than that of the low-print-density region 104 of the object image 100. FIG. 7(C2) shows a print-density of each pixel included in a row of (y=y0) in the post-correction image 110.

As described in FIG. 7, a square measure of the regions 112b, 114b is greater than that of the regions 112a, 114a. That is, the number of non-edge pixels in the regions 112b, 114b is more than the number of edge pixels in the regions 112a, 114a. As shown in FIG. 7(C2), although the print-density of each edge pixels, of which the number is a relatively few, is increased, since the print-density of each non-edge pixels, of which the number is relatively many, is reduced, it is possible to reduce the amount of ink consumption for printing based on the first print data corresponding to the post-correction image 110. Further, since the print-density of each edge pixel is increased in the post-correction image 110, it is possible to acquire the watercolor effect. That is, since the print-density of the region 112a adjacent to the boundary is increased on the side of the high-print-density region 102, a user can perceive that the print-density of a printed image corresponding to the region 112b apart from the boundary is higher than an actual print-density. Similarly, since the print-density of the region 114a adjacent to the boundary is increased on the side of the low-print-density region 104, a user can perceive that the print-density of a printed image corresponding to the region 114b apart from the boundary is higher than an actual print-density. According to the present exemplary embodiment, it is possible to realize the reduction of the amount of ink consumption, and provide the printed image, which the user easily perceives.

Further, in the present exemplary embodiment, as shown in FIG. 5, the values of the edge pixel are corrected in order that the higher the edge-intensity E(x, y) of the edge pixel is, the higher the print-density of the edge pixel is. Accordingly, as the edge-intensity of each edge pixel is higher, the user perceives easily the watercolor effect from the printed image in each non-edge pixel.

(First Comparative Art)

Figure 8:
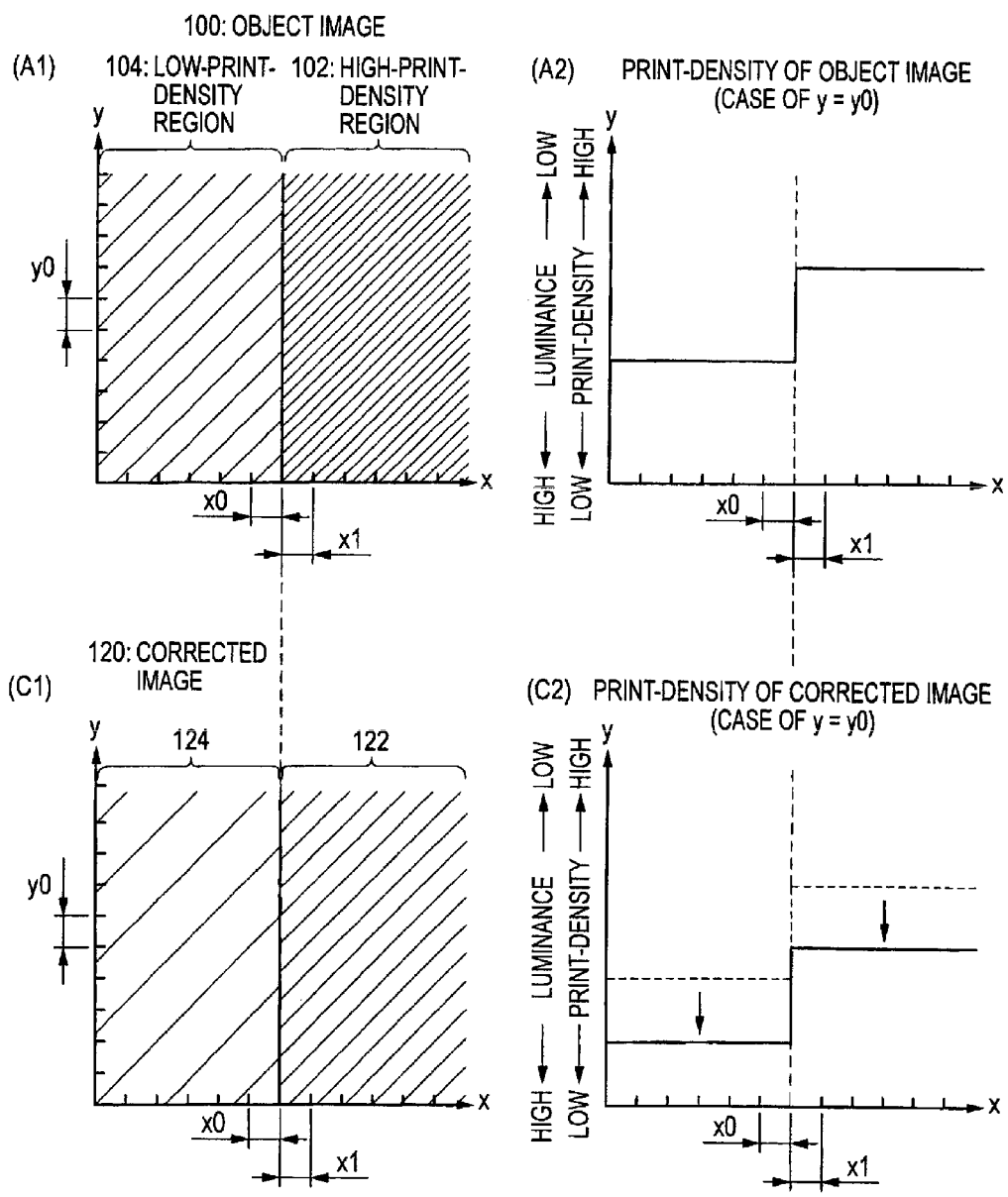
FIG. 8 is a view explaining a correction process in a first comparative art.

Simply speaking, the correction process of the present exemplary embodiment is different from a related process of saving a coloring material as described below. FIG. 8 is a view explaining an imaging process of the first comparative art. FIGS. 8(A1), 8(A2) are identical to FIGS. 7(A1), 7(A2). FIG. 8(C1) schematically shows a corrected image 120 generated by an imaging process of the first comparative art. FIG. 8(C2) shows a print-density of each pixel in a row of (y=y0) in a plurality of pixels in the corrected image 120. As shown in FIGS. 8(C1), 8(C2), in the imaging process of the first comparative art, values of all the pixels are corrected in order that the print-densities of all the pixels are reduced in both a high-print-density region 102 and a low-print-density region 104. That is, the print-density of the corrected image 120 in a high-print-density region 122 becomes lower than that of the high-print-density region 102, and the print-density of the corrected image 120 in a low-print-density region 124 becomes lower than that of the low-print-density region 104.

According to the imaging process of the first comparative art, because the print-density of the regions 122, 124 become lower, the amount of ink consumption is possible to be reduced. However, when the imaging process of the first comparative art is performed, it is difficult for a user to perceive the watercolor effect. On the contrary, according to this exemplary embodiment as shown in FIG. 7, in both the high-print-density region 102 and the low-print-density region 104, the print-densities of boundary regions 112a, 114a are increased. Therefore, since a print-density is to be higher, a user can perceive that the print-density of a printed image, which corresponds to regions 112b, 114b that are apart from a boundary, is higher than an actual print-density. That is, a user is possible to perceive the watercolor effect.

Figure 9:
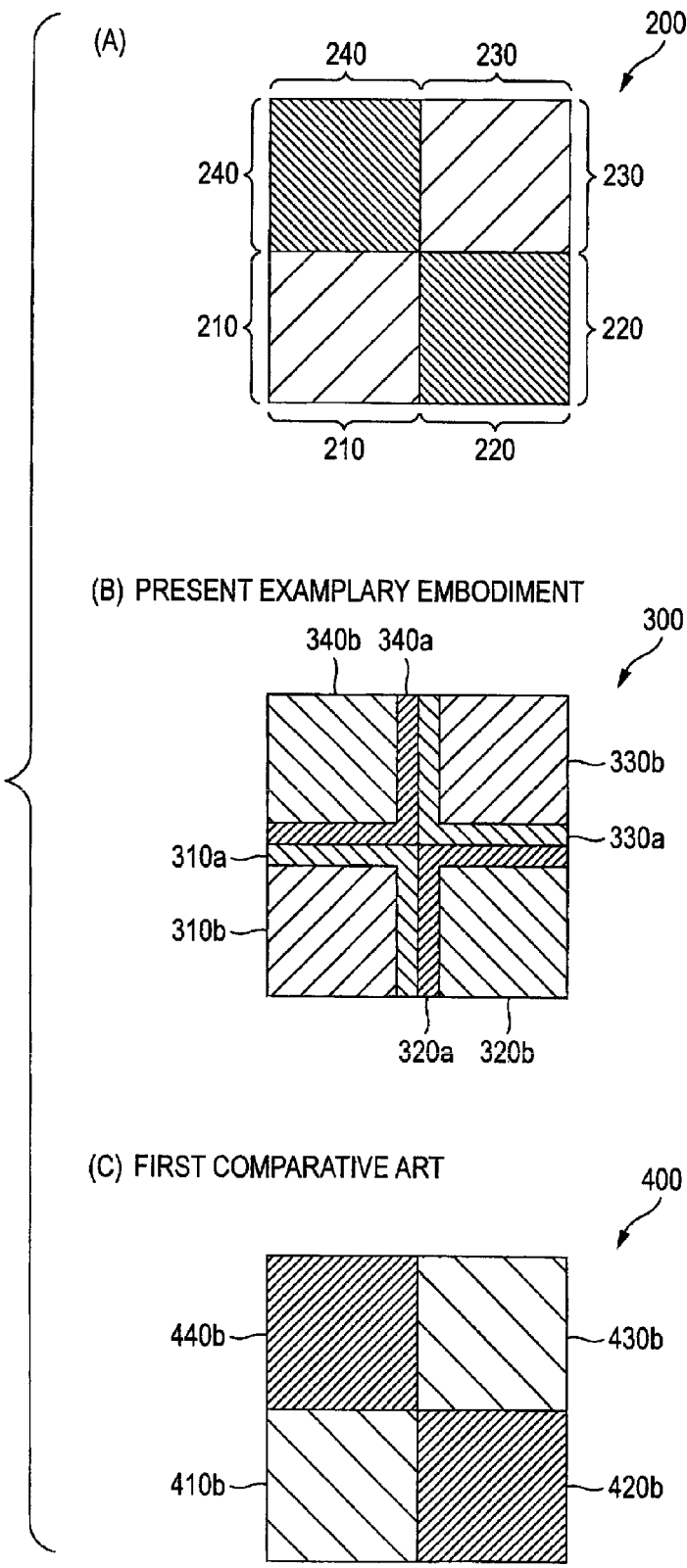
FIG. 9 is a view shows images in which a watercolor effect is appeared by a correction process in one aspect.

FIG. 9(A) shows an object image 200, which is different from the object image 100. The object image 200 contains two high-print-density regions 220, 240 and two low-print-density regions 210, 230. FIG. 9(B) shows a corrected image 300 acquired by the imaging process of the present exemplary embodiment, and FIG. 9(C) shows a corrected image 400 acquired by the imaging process (for saving a color-material) of the first comparative art. As an example, FIG. 9(B) shows a case that "win" in Expressions 2, 3 of FIG. 3 equals "2". Although the print-density of high-print-density regions 320b, 340b, which are apart from boundaries, equals that of high-print-density regions 420b, 440b in FIG. 9(C), the print-density of the high-print-density regions 320b, 340b seems to be higher than that of high-print-density regions 420b, 440b. Because a print-density of high-print-density regions 320a, 340a close to a boundary in FIG. 9(B) is higher than that of high-print-density regions 420b, 440b in FIG. 9(C), and thus the corrected image shown in FIG. 9(B) acquires the watercolor effect. Further, although the print-density of low-print-density regions 310b, 330b, which are apart from a boundary in FIG. 9(B), is equal to that of low-print-density regions 410b, 430b in FIG. 9(C), the print-density of the low-print-density regions 310b, 330b seems to be higher than that of the low-print-density regions 410b, 430b. Because the print-density of the low-print-density regions 310a, 330a, which are close to the boundary in FIG. 9(B), is higher than that of the low-print-density regions 410b, 430b in FIG. 9(C), the corrected image 300 shown in FIG. 9(B) shows the watercolor effect. As described in FIG. 9, since a user can easily perceive the watercolor effect compared to the configuration of the first comparative art, the present exemplary embodiment provides a printed image that is easy for a user to perceive.

(Second Comparative Art)

Figure 10:
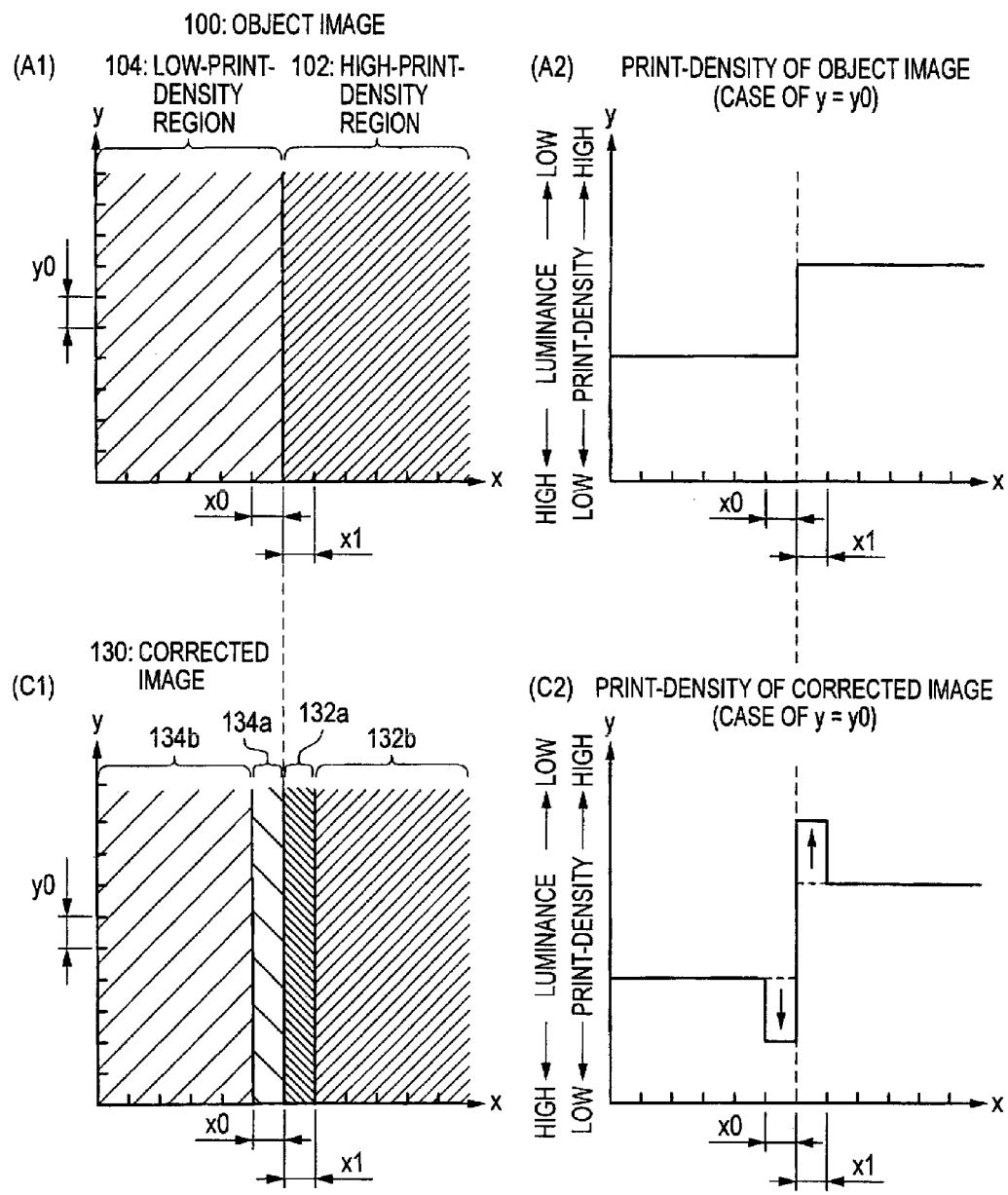
FIG. 10 is a view explaining a correction process of a second comparative art.

A correction process of this exemplary embodiment is different from an edge enhancement process in a comparative art, as described below in detail. FIG. 10 is a view explaining an imaging process (an edge enhancement process) of the second comparative art. FIGS. 10(A1), 10(A2) are identical to FIGS. 7(A1), 7(A2). FIG. 10(C1) schematically shows a corrected image 120 generated by the imaging process of the second comparative art. FIG. 10(C2) shows a print-density of each pixel included in a row of (y=y0) in a plurality of pixels in a corrected image 130. When the imaging process of the second comparative art is performed in the corrected image 130 as shown in FIGS. 10(C1), 10(C2), the print-density gradient of a boundary (i.e. an edge) between regions, which are corresponding to the high-print-density region 102 and the low-print-density region 104 in the object image 100, becomes larger, so that the edge of a printed image is enhanced.

In comparison of FIGS. 7(C1), 7(C2) with FIGS. 10(C1), 10(C2), when the correction process (step S14 in FIG. 2, and FIG. 3) of the present exemplary embodiment is performed, a corrected image is acquired. The corrected image is apparently different from an image acquired by the edge enhancement process of the second comparative art Specifically, as shown in FIGS. 10(C1), 10(C2), when the imaging process of the second comparative art is performed, on the side of the high-print-density region 102 of the object image 100, the values of each edge pixel are corrected to increase print-density of the each edge pixel (x=x1), but the values of each non-edge pixel are not corrected. For this reason, in the corrected image 130, while the print-density of a high-print-density region 132a close to a boundary becomes higher than that of the high-print-density region 102 in the object image 100, the print-density of a high-print-density region 132b apart from the boundary is equal to that of the high-print-density region 102 in the object image 100. Thus, the print-density distribution of the right high-print-density regions 132a and 132b of the corrected image 130 shown in FIGS. 10(C1), 10(C2) is different from a value of the right high-print-density regions 112a, 112b of the corrected image 110 shown in FIGS. 7(C1), 7(C2). Meanwhile, when the imaging process of the second comparative art is performed, on the side of the low-print-density region 104, the values of each edge pixel are corrected to decrease the print-density of each edge pixel (x=x0), but the values of each non-edge pixel are not corrected. For this reason, in the corrected image 130, while the print-density of a low-print-density region 134a close to a boundary becomes lower than that of the low-print-density region 104 of the object image 100, the print-density of a low-print-density region 134b apart from the boundary is equal to that of the low-print-density region 104. Thus, the print-density distribution of the left low-print-density regions 134a and 134b of the corrected image 130 shown in FIGS. 10(C1), 10(C2) is different from that of the left low-print-density regions 114a, 114b of the corrected image 110 shown in FIGS. 7(C1), 7(C2). Accordingly, the correction process of the present exemplary embodiment is apparently different from the edge enhancement process of the second comparative art.

Additionally, in the present exemplary embodiment, simple object images 100, 200 shown in FIGS. 7, 9 are illustrated for easy understanding of technique. On the other hand, when the present invention (correction process of FIG. 3) is applied to an object image (converted RGB image data) acquired from typical document data, a user is possible to perceive easily the watercolor effect. For example, it is assumed one case that the document data have a table including a plurality of cells having a black frame, colored with a single kind of color (e.g. only red or only blue) to form a solid area, and including a black character. In the object image acquired from such document data, each pixel forming the edge of the cell and each pixel forming the character in the cell are determined as edge pixels. Further, among the pixels forming the solid area other than the characters in the cell, each pixel, which is close to a boundary between the edge of the cell and the solid area, and each pixel, which is close to a boundary between the character and the solid area, are also determined as edge pixels. Then, the print-density of the solid area is increased and the print-density of each pixel at a position apart from the boundary is decreased. Accordingly, in spite of actually reducing the print-density of the solid area, the print-density of the solid area is possible to be perceived by a user as if the print-density was not much reduced. That is, although the amount of ink consumption is reduced, a print image can be provided that is easy for a user to perceive.

Herein, a correspondence relationship between respective elements of the present exemplary embodiment and the present invention will be described. A PC 10 is an example of an "image processing apparatus", and a printer 60 is an example of a "printing executing section". Converted RGB image data 80 is an example of "original image data" and "object image data". Edge-intensity E(x, y) is an example of an "index value relating an edge-intensity". An ink save mode is an example of a "first mode", a normal mode is an example of a "second mode", and Step S14, step S16 and step S20 of FIG. 2 are examples of a "first imaging process". Step S16 and step S20 of FIG. 2 are examples of a "second imaging process". A value "0" used in step S34 of FIG. 3 is an example of a "threshold value". The low-print-density region 104 and the high-print-density region 102 shown in A1 of FIG. 7 are examples of a "first region" and a "second region", respectively. A group of pixels included in the low-print-density region 104 is an example of a "first pixel group". A group of pixels included in a column of (x=x0) in the low-print-density region 104 is an example of "first adjacent pixels". A group of pixels not-included in the column of (x=x0) in the low-print-density region 104 is an example of "first not-adjacent pixels", respectively. Further, a group of pixels in the high-print-density region 102, a group of pixels included in a column of (x=x1) in the high-print-density region 102, and a group of pixels not-included in the column of (x=x1) in the high-print-density region 102 are examples of a "second pixel group", a "second group of adjacent pixels", and a "second group of not-adjacent pixels", respectively.

Modified exemplary embodiments of the above exemplary embodiments will be described.

(1) The controller 66 of the printer 60 may include a first processing unit 40, a second processing unit 50, and a supplying unit 52. In this case, the supplying unit 52 may supply first print data or second print data to the printing executing section in the printer 60. Here, the printing executing section may include a print device 62 and a print control unit in the controller 66. In this modified exemplary embodiment, the printer 60 is an example of an "image processing apparatus".

(2) The printer 60 may perform printing using toner instead of ink. That is, generally, a "color-material" is not limited to ink, but may be toner.

(3) In the above exemplary embodiment, the edge-intensity E(x, y) of a target pixel is calculated on the basis of the Expressions 1 to 3 of FIG. 3. However, an "index value relating an edge-intensity of a target pixel" may be calculated by using a well-known first differential filter such as a Sobel filter, a secondary differential filter such as a Laplacian filter, or the like, instead of the method of the exemplary embodiment. For example, $(E(x, y)=|P(x, y)-P(x-1, y)|)$ that is acquired by the first differential filter may be used.

(4) Further, in the above exemplary embodiment, a value of P(x, y) about luminance of a target pixel is calculated on the basis of Expression 1 of FIG. 3. However, the value of P(x, y) about luminance of the target pixel may be calculated on the basis of an expression (e.g. $P(x, y)=G(x, y)$) that is different from Expression 1.

(5) In the above exemplary embodiment, as shown in FIG. 7, both the high-print-density region 102 and the low-print-density region 104 are corrected. That is, the high-print-density region 102 is corrected in order that the print-density of the region 112a is increased and the print-density of the region 112b is decreased, and further, the low-print-density region 104 is corrected in order that the print-density of the region 114a is increased and the print-density of the region 114b is decreased. However, either the high-print-density region 102 or the low-print-density region 104 may be corrected. For example, while the low-print-density region 104 may be corrected in order that the print-density of the region 114a is increased and the print-density of the region 114b is decreased, the values of the respective pixels (edge pixels and non-edge pixels) in the high-print-density region 102 may not be corrected. On the other hand, for example, while the high-print-density region 102 may be corrected in order that the print-density of the region 112a is increased and the print-density of the region 112b is decreased, the values of the respective pixels (edge pixels and non-edge pixels) in the low-print-density region 104 may not be corrected. Compared to the configuration in which only the low-print-density region 104 is corrected, the configuration in which only the high-print-density region 102 is corrected has possibility to reduce the amount of ink consumption.

(6) In the above exemplary embodiment, the first processing unit 40 performs the correction process of step S14 of FIG. 2 on converted RGB image data. The first processing unit 40 performs the correction process in RGB color space. However, the first processing unit 40 may perform the correction process in CMYK color space. That is, the first processing unit 40 may generate CMYK image data by performing the color conversion process of step S16 on the converted RGB image data, and then the first processing unit 40 may perform the correction process on the CMYK image data. In this case, the calculating unit 42 of the first processing unit 40 may calculate a value about luminance of a target pixel described with CMYK format. For example, the calculating unit 42 may convert a value of CMYK of the target pixel into a value of RGB and may calculate a value about the luminance of the target pixel on the basis of Expression 1 of FIG. 3, based on the values of RGB. Further, the correcting unit 46 may correct the values of CMYK of each edge pixel such that the print-density of each edge pixel in the CMYK image data increases, and the correcting unit 46 may also correct the values of CMYK of each non-edge pixel such that the print-density of each non-edge pixel in the CMYK image data decrease. Additionally, the first processing unit 40 may perform the correction process in a color space other than the RGB color space and the CMYK color space (e.g. HSV color space).

(7) The threshold value that is compared with E(x, y) in step S34 of FIG. 3 may not be "0", or otherwise may be larger than "0".

(8) In the edge correction process of step S36 of FIG. 3 of the above exemplary embodiment, the values of the target pixel are corrected in order that the more E(x, y) increases, the more an amount of correction increases. Instead, the values of the target pixel may be corrected by constant amount, irrespective of the value of E(x, y) (i.e., the print-density of the target pixel is increased by a constant amount). Further, in the non-edge correction process of step S38 of FIG. 3, the value of the target pixel may be corrected by a constant amount (i.e. the print-density of the target pixel decrease by a constant amount).

(9) In the above exemplary embodiment, although four-valued print data is generated, the generated print data may have less than four-values (e.g. two-values corresponding ON/OFF in a dot) or more than four-values.

(10) In the above exemplary embodiment, it is described one case that a unit pixel (i.e. a single pixel) in the converted RGB image data 80 corresponds to a dot in a dot-forming region of an amount of a printed image. Accordingly, as the value of RGB of the unit pixel becomes higher, the size of the dot (occupancy area) to be formed on the dot-forming region becomes smaller. Meanwhile, as the value of RGB of the unit pixel becomes lower, the size of the dot (occupancy area) formed on the dot-forming region becomes larger. However, a unit pixel (i.e. single pixel) in the converted RGB image data 80 may correspond to plural dots in a printed image. In this case, for example, as the value of RGB of the unit pixel becomes higher, an occupancy area of dots to be formed on the dot-forming region becomes smaller. And then, as the value of RGB of the unit pixel becomes lower, the occupancy area of dots formed on the dot-forming region becomes greater.

Although the exemplary embodiments are described in detail, above-described exemplary embodiments are only examples, and the scope of claims is not limited by the examples. The scope of claims includes a variety of modifications and changes of the above-illustrated exemplary embodiments.

Further, the technical elements described in the specification or drawings demonstrate the technical utility by a single element or various combinations, and the invention is not limited to the combination described in claims when the application was filed. Further, the present invention achieves simultaneously one or more purposes, and it has the technical utility by achieving only one of the purposes in itself.

What is claimed is:

1. An image processing apparatus configured to cause a printing executing section to perform a printing process using color-materials, comprising:

a controller configured to:
perform first image-processing by processing original image data in order to generate first processed image data; and
supply the first processed image data to the printing executing section in response to the first processed image data being generated,
wherein performing the first image-processing comprises:
calculating an index value relating an edge-intensity about a target pixel in object image data;
correcting a value of the target pixel such that print-density of the target pixel increases in response to the target pixel being a first type of pixel, the first type pixel representing that the index value of the target pixel indicates the edge-intensity of the target pixel being relatively high; and
correcting the value of the target pixel such that print-density of the target pixel decreases in response to the target pixel being a second type of pixel, the second type pixel representing that the index value of the target pixel indicates the edge-intensity of the target pixel being relatively low, and
wherein, in response to the target pixel being the first type of pixel, as the index value of the target pixel indicates the edge-intensity of the target pixel being higher, the controller is configured to correct the value of the target pixel so that the print-density of the target pixel becomes higher.

2. The image processing apparatus according to claim 1, wherein, in response to the target pixel being the second type of pixel, the controller is configured to correct the value of the target pixel so that the print-density of the target pixel is equal to or less than a predetermined density.

3. The image processing apparatus according to claim 1, wherein the controller is further configured to:
perform second image-processing by processing the original image data in order to generate second processed image data; and
supply the second processed image data to the printing executing section in response to the second processed image data being generated,
wherein the printing executing section is configured to perform the printing process in a first mode or a second mode,
wherein the controller is configured to perform the first image-processing in response to the first mode being selected,
wherein the controller is configured to perform the second image-processing in response to the second mode being selected,
wherein, in response to the target pixel being the first type of pixel, the controller is configured to correct the value of the target pixel so that the print-density of the target pixel to be printed in the first mode is higher than that of the target pixel to be printed in the second mode, and
wherein, in response to the target pixel being the second type of pixel, the controller is configured to correct the value of the target pixel so that the print-density of the target pixel to be printed in the first mode is lower than that of the target pixel to be printed in the second mode.

4. The image processing apparatus according to claim 1, wherein the controller is further configured to:
determine whether the target pixel is the first type of pixel or the second type of pixel by comparing the index value of the target pixel with a threshold value.

5. An image processing apparatus configured to cause a printing executing section to perform a printing process using a color-material, comprising:
a controller configured to:
perform a first image-processing by processing original image data in order to generate first processed image data; and
supply the first processed image data to the printing executing section in response to the first processed image data being generated,
wherein the performing of the first image-processing comprises:
detecting a boundary between a first region and a second region, wherein the first region and the second region are included in an object image represented by object image data to be processed, wherein the first region and the second region are adjacent to each other, wherein a value of a first pixel group included in the first region is different from a value of a second pixel group included in the second region, and wherein the print-density indicated by the first pixel group belonging to the first region is lower than the print-density indicated by the second pixel group belonging to the second region; and
correcting the value of the first pixel group included in the first region, and
wherein the correcting of the value of the first pixel group comprises:
correcting values of first adjacent pixels, which are a part of the first pixel group and located adjacent to the second region, such that the print-density of the first adjacent pixels increase; and
correcting values of first not-adjacent pixels, which are a part of the first pixel group and located apart from the second region, such that the print-density of the first not-adjacent pixels decrease.

6. The image processing apparatus according to claim 5, wherein the print-density of the first pixel group that is indicated by a not yet corrected value of the first pixel group is lower than the print-density of the second pixel group that is indicated by a not yet corrected value of the second pixel group.

7. The image processing apparatus according to claim 5, wherein the controller is configured to correct the value of the second pixel group included in the second region, and
wherein the correcting of the value of the second pixel group comprises:
correcting a value of second adjacent pixels, which are a part of the second pixel group and located adjacent to the first region, such that the print-density of the second adjacent pixels increase, and
correcting a value of second not-adjacent pixels, which are a part of the second pixel group and located apart from the first region, such that the print-density of the second not-adjacent pixels decrease.

8. The image processing apparatus according to claim 5, wherein the controller is further configured to:
perform a second image-processing by processing original image data in order to generate second processed image data; and
supply the second processed image data to the printing executing section when the second processed image data is generated,
wherein the printing executing section is configured to perform the printing process in a first mode or a second mode,
wherein the controller is configured to perform the first image-processing in response to the first mode being selected,
wherein the controller is configured to perform the second image-processing in response to the second mode being selected,
wherein the controller is configured to correct the value of the first adjacent pixels so that the print-density of the first adjacent pixels to be printed in the first mode is higher than the print-density of the first adjacent pixels to be printed in the second mode, and
wherein the controller is configured to correct the value of the first not-adjacent pixels so that the print-density of the first not-adjacent pixels to be printed in the first mode is lower than the print-density of the first not-adjacent pixels to be printed in the second mode.

9. A non-transitory computer-readable medium storing computer-readable instructions that, when executed by a controller of an image processing apparatus that is configured to cause a printing executing section to perform process using color-materials, instruct the controller to execute processes comprising:
performing a first image-processing by processing original image data to generate first processed image data; and
supplying the first processed image data to the printing executing section in response to the first processed image data being generated,
wherein the performing of first image-processing comprises:
calculating an index value relating an edge-intensity about a target pixel in object image data;
correcting a value of the target pixel such that print-density of the target pixel increases in response to the target pixel being a first type of pixel, the first type pixel representing that the index value of the target pixel indicates the edge-intensity of the target pixel being relatively high; and
correcting the value of the target pixel such that print-density of the target pixel decreases in response to the target pixel being a second type of pixel, the second type pixel representing that the index value of the target pixel indicates the edge-intensity of the target pixel being relatively low, and
wherein, in response to the target pixel being the first type of pixel and, as the index value of the target pixel indicates the edge-intensity of the target pixel being higher, the instructions instruct the controller to correct the value of the target pixel so that the print-density of the target pixel becomes higher.

10. The non-transitory computer-readable medium according claim 9,
wherein, in response to the target pixel being the second type of pixel, the instructions instruct the controller to correct the value of the target pixel so that the print-density of the target pixel is equal to or less than a predetermined density.

11. The non-transitory computer-readable medium according claim 9, wherein the instructions further instruct the controller to execute processes comprising:
performing second image-processing by processing the original image data to generate second processed image data; and
supplying the second processed image data to the printing executing section in response to the second processed image data being generated, wherein the printing executing section is configured to perform the printing process in a first mode or a second mode, wherein the instructions instruct the controller to perform the first image-processing in response to the first mode being selected, wherein the instructions instruct the controller to perform the second image-processing in response to the second mode being selected, wherein, in response to the target pixel being the first type of pixel, the instructions instruct the controller to correct the value of the target pixel so that the print-density of the target pixel to be printed in the first mode is higher than that of the target pixel to be printed in the second mode, and wherein, in response to the target pixel being the second type of pixel, the instructions instruct the controller to correct the value of the target pixel so that the print-density of the target pixel to be printed in the first mode is lower than that of the target pixel to be printed in the second mode.

12. The non-transitory computer-readable medium according claim 9, wherein the instructions further instruct the controller to execute processes comprising:

determining whether the target pixel is the first type of pixel or the second type of pixel by comparing the index value of the target pixel with a threshold value.

13. A non-transitory computer-readable medium storing computer-readable instructions that, when executed by a controller of an image processing apparatus that is configured to cause a printing executing section to perform process using color-materials, instruct the controller to execute processes comprising:

performing a first image-processing by processing original image data to generate first processed image data; and supplying the first processed image data to the printing executing section in response to the first processed image data being generated;

wherein the performing of the first image-processing comprises:

detecting a boundary between a first region and a second region, wherein the first region and the second region are included in an object image represented by object image data to be processed, wherein the first region and the second region are adjacent to each other, wherein a value of a first pixel group included in the first region is different from a value of a second pixel group included in the second region, and wherein the print-density indicated by the first pixel group belonging to the first region is lower than the print-density indicated by the second pixel group belonging to the second region; and correcting the value of the first pixel group included in the first region, and wherein the correcting of the value of the first pixel group comprises:

correcting values of first adjacent pixels, which are a part of the first pixel group and located adjacent to the second region such that the print-density of the first adjacent pixels increase; and correcting values of first not-adjacent pixels, which are a part of the first pixel group and located apart from the second region such that the print-density of the first not-adjacent pixels decrease.

14. The non-transitory computer-readable medium according claim 13, wherein the print-density of the first pixel group that is indicated by a not yet corrected value of the first pixel group is lower than the print-density of the second pixel group that is indicated by a not yet corrected value of the second pixel group.

15. The non-transitory computer-readable medium according claim 13, wherein the instructions further instruct the controller to execute processes comprising:

correcting the value of the second pixel group included in the second region, wherein the correcting of the value of the second pixel group comprises:

correcting a value of second adjacent pixels, which are a part of the second pixel group and located adjacent to the first region, such that the print-density of the second adjacent pixels increase; and correcting a value of second not-adjacent pixels, which are a part of the second pixel group and located apart from the first region, such that the print-density of the second not-adjacent pixels decrease.

16. The non-transitory computer-readable medium according claim 13, wherein the instruction further instruct the controller to execute processes comprising:

performing a second image-processing by processing original image data to generate second processed image data; and supplying the second processed image data to the printing executing section in response to the second processed image data being generated, wherein the printing executing section is configured to perform the printing process in a first mode or a second mode, wherein the instructions instruct the controller to perform the first image-processing in response to the first mode being selected, wherein the instructions instruct the controller to perform the second image-processing in response to the second mode being selected, wherein the instructions instruct the controller to correct the value of the first adjacent pixels so that the print-density of the first adjacent pixels to be printed in the first mode is higher than the print-density of the first adjacent pixels to be printed in the second mode, and wherein the instructions instruct the controller to correct the value of the first not-adjacent pixels so that the print-density of the first not-adjacent pixels to be printed in the first mode is lower than the print-density of the first not-adjacent pixels to be printed in the second mode.

* * * * *